Oct. 20, 1970     G. S. HAVILAND     3,534,625
GEAR DRIVE ASSEMBLY FOR ANTI-WHEEL LOCK-UP CONTROL DEVICE
Filed Jan. 23, 1969     2 Sheets-Sheet 1
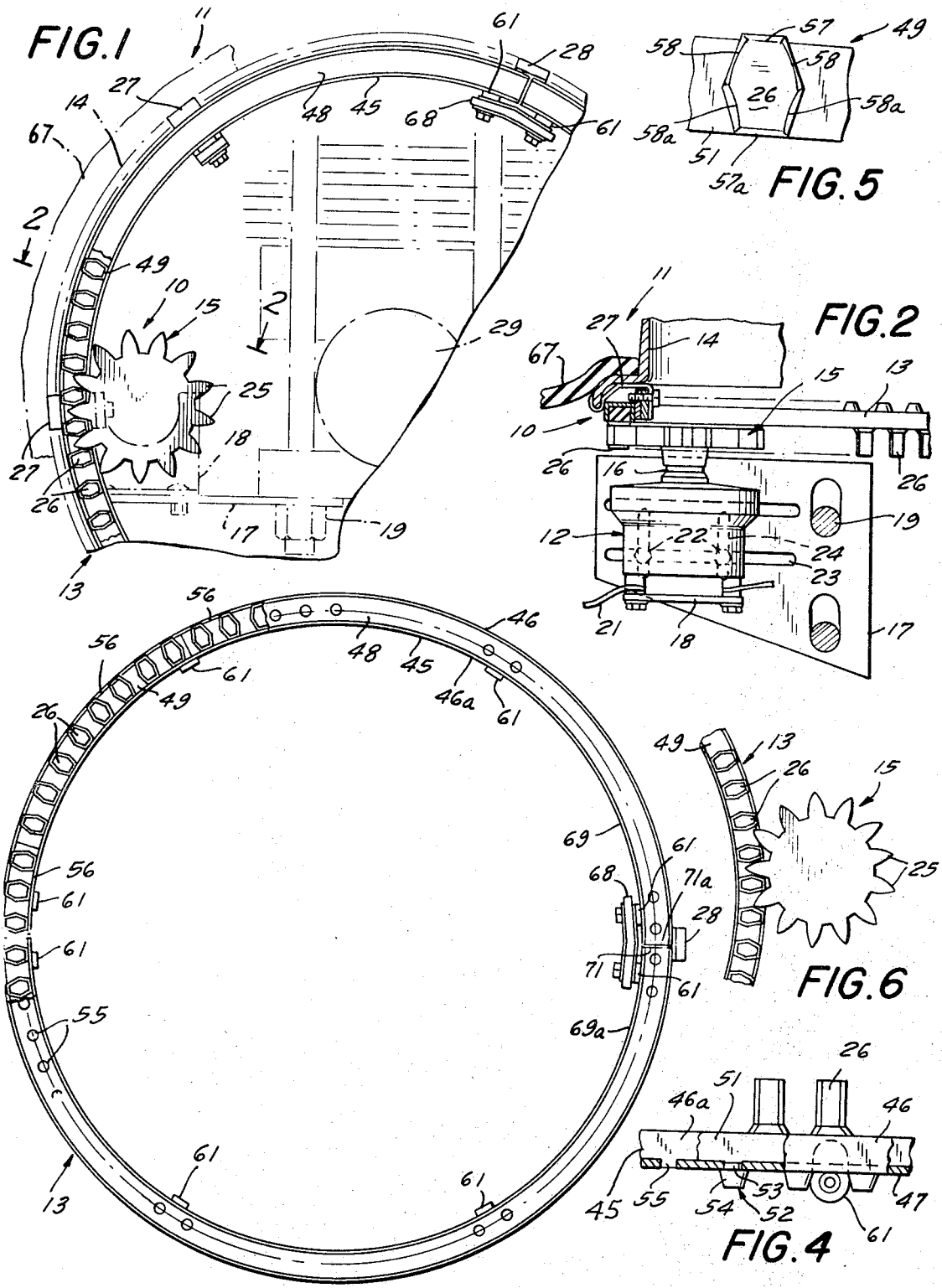
INVENTOR
GIRARD S. HAVILAND
BY
Stephen J. Rudy
ATTORNEY Oct. 20, 1970  G. S. HAVILAND  3,534,625
GEAR DRIVE ASSEMBLY FOR ANTI-WHEEL LOCK-UP CONTROL DEVICE
Filed Jan. 23, 1969  2 Sheets-Sheet 2
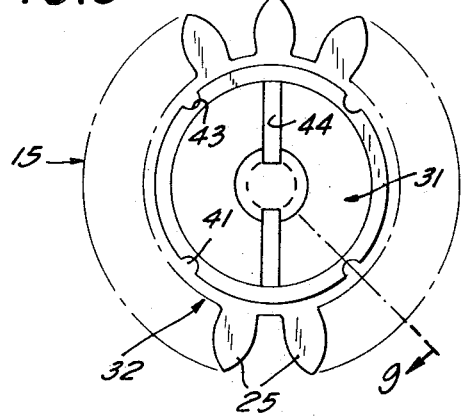
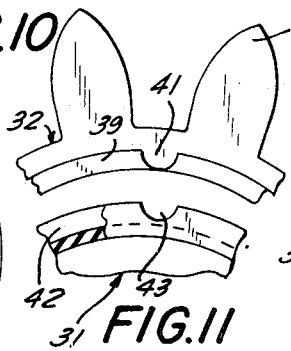
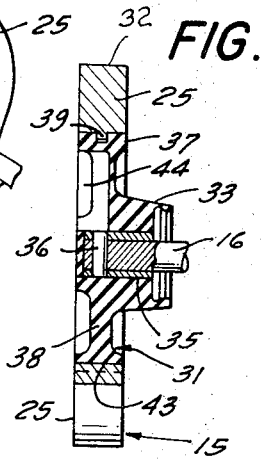
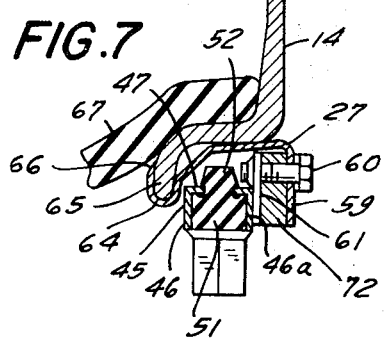
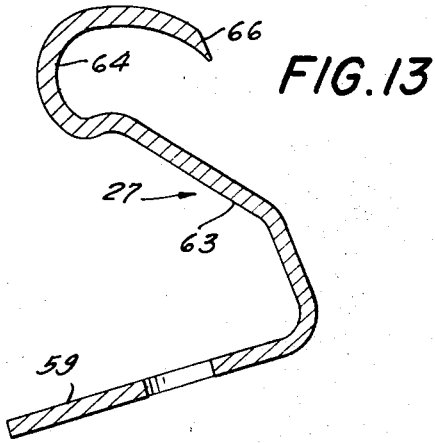
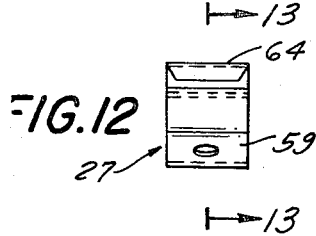
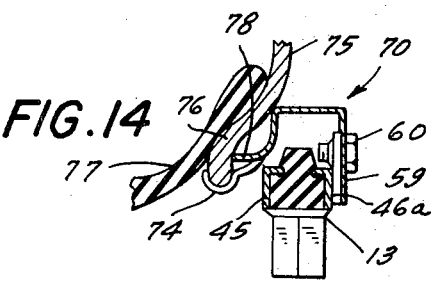
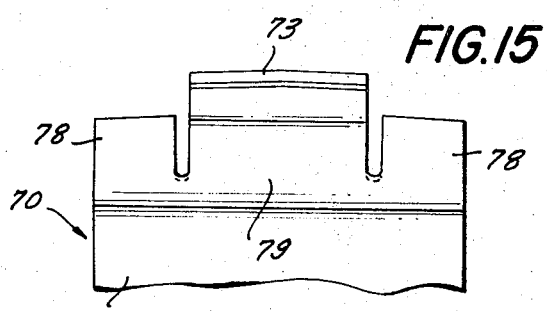
INVENTOR
GIRARD S. HAVILAND
BY
Stephen J. Rudy
ATTORNEY

United States Patent Office 3,534,625
Patented Oct. 20, 1970

3,534,625
GEAR DRIVE ASSEMBLY FOR ANTI-WHEEL LOCK-UP CONTROL DEVICE
Girard S. Haviland, West Hartford, Conn., assignor to The Jacobs Manufacturing Company, West Hartford, Conn., a corporation of New Jersey
Filed Jan. 23, 1969, Ser. No. 793,310
Int. Cl. F16h 57/00, 55/14, 55/12
U.S. Cl. 74—411                                                13 Claims

ABSTRACT OF THE DISCLOSURE

A gear drive assembly adapted to transmit the rotation of a motor vehicle wheel to the input shaft of an anti-wheel lock-up control device so as to control skidding. A ring gear unit of the assembly is detachably mountable by means of clips to a wheel rim adjacent the tire. The unit includes an annular metal channel base to which the clips are anchored. A ring gear defined by means of a succession of elastomeric segments plugged into the base has a succession of elongated teeth projecting from its exposed face. The gear teeth engage with a pinion unit mounted to the input shaft. The pinion unit is formed of an elastomeric hub member upon which is releasably interlocked a separate pinion body having pinion teeth. The pinion body is of stiffer material than the hub member. The latter is adapted to resiliently deform under a predetermined torque overload applied to the pinion unit by the ring gear. This causes the pinion body to become released from the hub without damage to the ring gear unit. The teeth of the ring gear are of a composite double form so that they may be engaged with the pinion teeth whether the latter are located proximate the inside or the outside diameter of the ring gear. The channel base of the ring gear unit comprises a pair of half-sections which are adapted to be assembled about the axle of the wheel and then rigidly bridged together by means of a pair of clips.

BACKGROUND OF INVENTION

The invention relates to a gear drive assembly for an anti-wheel lock-up control device used on motor vehicles to avoid skidding. The assembly is of a type that is arranged externally of a wheel of a motor vehicle so as to drivingly connect the wheel with an anti-wheel lock-up control device mounted to a support in the vicinity of the wheel.

A gear drive assembly of this general nature is known from a co-pending patent application, Ser. No. 688,427, filed Dec. 6, 1967, entitled Gear Drive for Anti-Skid Device, now issued as Pat. No. 3,447,838, dated June 3, 1969. In this known assembly, a beveled ring gear serves to transmit rotation of the wheel through a beveled pinion to the control device.

The present invention differs from the foregoing known assembly in various respects, such as in the nature of the ring gear and the elements for mounting it to a wheel of the vehicle, and in the nature of the pinion to which the ring gear transmits the rotation of the wheel.

A feature of the present invention is a ring gear unit having a metal annular channel base adapted to be detachably mounted to the rim of a motor vehicle wheel. In the channel base is detachably seated an elastomeric ring gear having axially projecting gear teeth. The ring gear is formed of a succession of separate segments seated end to end in the channel base. This segmental construction permits replacement of worn segments without disturbing the remaining segments. The gear teeth are of a dual nature in that they can be engaged with the pinion whether the pinion is located proximate the inside or outside diameter of the ring gear.

A further feature of the present invention is a pinion unit with which the ring gear is drivingly engageable. The pinion unit is formed of a hub section mountable to a shaft of the control device and of a pinion body separably mounted to the hub section. The hub section is formed of elastomeric material which is adapted under overload to deform so as to enable the pinion body to become separated therefrom without consequent damage to either the hub section or the pinion body.

A further feature of the present invention is provided by the elements employed for mounting the ring gear unit to a wheel rim of the motor vehicle. The mounting elements are clips of a simple one-piece construction.

BRIEF DESCRIPTION OF THE DRAWINGS

In the accompanying drawings:

FIG. 1 is a fragmentary elevational view of a gear drive assembly embodying the invention, shown as connecting a wheel of a motor vehicle with an anti-wheel lock-up control device;

FIG. 2 is a section taken on line 2—2 of FIG. 1;

FIG. 3 is a detail in plan of the ring gear unit with portions broken away, and shows one of the splicing clips mounted thereon;

FIG. 4 is a fragmentary detail section in elevation of FIG. 3;

FIG. 5 is an enlarged detail in plan of one of the ring gear teeth;

FIG. 6 is a detail illustrating the engagement of the ring gear unit by the pinion gear unit when the latter is positioned relative to the outside diameter of the ring gear unit;

FIG. 7 is an enlarged detail showing the mounting relation of the ring gear unit to the wheel rim;

FIG. 8 is a detail in elevation of the pinion unit as viewed from the left of FIG. 9;

FIG. 9 is a section taken on line 9—9 of FIG. 8;

FIG. 10 is an enlarged fragmentary detail of the pinion body member of the pinion gear unit;

FIG. 11 is an enlarged fragmentary detail of the hub section of the pinion gear unit;

FIG. 12 is a detail in elevation of a mounting clip for the ring gear unit as viewed from the right of FIG. 13;

FIG. 13 is an enlarged section taken on line 13—13 of FIG. 12;

FIG. 14 is a view similar to FIG. 7 but showing a modified form of the mounting clip designed for use with a wheel rim mounting a tubeless tire; and FIG. 15 is an enlarged elevational view of the upper portion of the clip shown in FIG. 14, the lower portion being substantially the same as that shown in FIG. 13.

DETAILED DESCRIPTION OF PREFERRED EMBODIMENT

Reference is directed to the accompanying drawings wherein a gear drive assembly 10 (FIGS. 1–2) embodying the invention is illustrated as drivingly engaging one of the wheels 11 of a motor vehicle with an anti-wheel lock-up control device 12. The assembly 10 includes a ring gear unit 13 detachably mounted to the rim 14 of the wheel; and a pinion unit 15 drivingly engaged by the ring gear unit. The pinion unit is mounted upon an externally projecting input shaft 16 of the control device. The vehicle with which the assembly 10 and control device 12 are associated is equipped with conventional air-brake mechanism (not shown).

The control device 12 is detachably mounted by means of brackets 17 and 18 to a convenient support of the vehicle in the vicinity of the inner area of a wheel 11. Here, it is secured to the usual U-bolt spring support 19 of the vehicle. The control device is interconnected in the usual air-brake service line 21 between the pressure air service tank (not shown) and the pressure air-brake chamber (not shown) related to the wheel. In the operation of the control device, rotation of wheel 11 is transmitted through the gear drive assembly 10 to the input shaft 16. The latter operates to drive internal mechanism of the control device; which mechanism acts in response to rapid changes in deceleration of the wheel to cause alternate relief of service air from, and feeding of service air to, the pressure air brake chamber so as to control braking action on the wheel when a wheel lock-up condition is imminent. This controlled braking action avoids development of a wheel lock-up condition and consequent skidding.

The brackets 17 and 18 are adjustably mounted to one another by means of bolts 22 engaged in slots 23 and 24, which slots extend crosswise of one another in the respective brackets. By means of this bracket mounting arrangement, the control device 12 may be selectively adjusted both axially and laterally relative to the wheel 11 so as to bring the teeth 25 of the pinion unit into a desirable meshed engagement with the teeth 26 of the ring gear unit 13. The ring gear unit is detachably mounted by means of a group of clips 27 and 28 to the rim 14 of the wheel 11. The ring gear unit is disposed coaxially with the axle 29 of the wheel.

The pinion unit 15, detailed in FIGS. 8–11, comprises a hub section 31 upon which a separable annular pinion body 32 having radially extending pinion teeth 25 about its periphery is releasably interlocked. The hub section 31 is formed of elastomeric material such as rubber. The pinion body 32, together with its teeth 25, is formed of a stiffer material such as plastic, here nylon plastic. The hub section has a boss 33 extending centrally from a front face thereof. An axial bore in the boss is fitted with a bushing 35. An external end of the input shaft 16 of the control device is received in the bushing; and the hub section of the pinion unit is retained upon the shaft by means of a pin 36.

The hub section 31 is of general T-form in cross-section (FIG. 9), having a broad peripheral rim 37 connected by means of an annular web 38 with its central bossed area. The pinion body portion 32 is separably interlocked with the hub section 31 by means of an annular rib 39 extending centrally about its inner diameter wall and by means of a group of transversely extending ribs 41. Rib 39 and the transverse ribs 41 are seated respectively in a complementary groove 42 extending centrally about the rim of the hub section, and in complementary notches 43 extending transversely of groove 42. When, for some reason, the pinion unit 15 offers a predetermined resistance to torque being applied to it by the ring gear unit 23, the pinion body 32 will be forced by the ring gear unit out of its interlocked condition and freed from the hub section 31. In this action, the hub section 31 will resiliently flex and deform under the torque overload causing the pinion body portion 32 to become separated from it. A pair of diametrically opposed slots 44 in the hub section provide a depleted wall area tending to promote the deforming action. The separation will be effected without damage to either the pinion body portion or the hub section. The pinion body portion may subsequently be remounted upon the hub section after the cause of the torque resistance is relieved.

The ring gear unit 13 (FIGS. 1–7) of the gear drive assembly includes an annular channel base 45 which is of U-form in cross section as best appears in FIG. 7. The base includes a pair of parallel annular side walls 46, 46a bridged by a back wall 47 so as to define an annular channel 48. The base is formed of hard metal such as steel. A ring gear 49 has an annular resilient body 51 which is seated fast in the base, only a portion of the ring gear being shown in FIGS. 1 and 3. A succession of equally spaced elongated gear teeth 26 project axially from the exposed face of the gear body 51. The gear body, together with its teeth, is integrally formed by moulding from elastomeric material such as rubber. The body 51 of the gear has a squeeze-tight fit in the channel 48 of the base. It is further anchored in the channel by means of a succession of equally spaced plugs 52 depending integrally from its underside. Each plug has a neck 53 terminating in a truncated conical head 54 of larger diameter. A series of holes 55 are provided in the bottom or back wall 47 of the channel, in each of which a separate plug 52 is adapted to be received. The diameter of the hole 55 corresponds to that of the plug's neck. In seating the gear body into the channel, each plug is forced through a registered hole until the neck portion is contained in the hole. By means of this constructional arrangement, the gear body is caused to be anchored fast in the channel without the necessity of using bonding cement.

The ring gear 49 is shown here (FIG. 3) as consisting of a succession of segments 56 disposed in the channel in end-to-end relation to fill the channel base 45. This construction is of particular advantage in that it facilitates the assembly of the gear body, segment by segment, into the channel. In the event a particular segment should for some reason become damaged or worn, it may be replaced by a new segment without disturbing any of the other segments.

The gear teeth 26 are designed for engagement with the pinion teeth 25, whether the pinion unit 15 is located proximate the inside or outside diameter of the gear, as indicated in FIGS. 1 and 6. Toward this end, the gear teeth 26 are elongated and of general hexagonal form in cross section. Each gear tooth, as best seen in FIG. 5, has a pair of opposed inner and outer diameter walls 57, 57a, and two pairs of side walls 58 and 58a. The walls 57 and 57a are substantially concentric respectively with the outer and inner diameters of the ring gear. In this form, each of the gear teeth is in effect a double tooth. It provides a three-sided tooth portion defined by the walls 57 and 58 facing the outer diameter of the gear, which tooth portion is engageable between the pinion teeth when the pinion unit is located proximate the outside of the ring gear as in FIG. 6; and it provides an opposed tooth portion defined by the walls 57a and 58a facing the inner diameter of the gear, which tooth portion is engageable between the pinion teeth when the pinion unit is located proximate the inside of the ring gear, as in FIG. 1. The gear teeth are sufficiently elongated so as to project axially between the pinion teeth for the full axial dimension of the latter, as appears in FIG. 2. The faces of the walls 58 are shown here as being slightly convex and those of the walls 58a as slightly concave. This gives to the gear tooth a slightly rolling or involute surface.

The ring gear unit 13 is shown in FIGS. 1, 2 and 7 as detachably mounted to the wheel rim 14 by means of a group of clips 27 and 28. These are formed of hard spring metal. Each of the clips 27 (FIGS. 7, 12 and 13) has a mounting plate 59 at one end which is bolted, as at 60, to a supporting flange 61. The latter is fixed to the inner diameter wall 46a of the channel base 45. A web section 63 of the clip terminates in a hook 64. The hook is adapted to be pressed or clipped over the peripheral lip 65 of the wheel rim, as best seen in FIG. 7. The hook provides a smooth non-biting tapered outer surface 66 adjacent the side wall of the wheel tire 67.

The remaining clips 28, of which there are two, one being shown in FIGS. 1 and 3, are identical to clips 27 except that its mounting plate 68 is relatively longer in a transverse direction. The elongated plate 68 is used to rigidly bridge or splice together two opposed identical half sections 69, 69a forming the channel base 45. The channel base is formed of two sections so as to facilitate its assembly about the wheel axle 29 without requiring the wheel to be first removed. Each clip splicing plate 68 is designed to bridge a pair of abutting ends 71, 71a of the half sections forming the channel base in such manner that a portion of the plate overlies and is bolted to a mounting plate 61 of one of the sections and the opposite portion overlies and is bolted to a mounting plate 61 of the other section, as indicated in FIGS. 1 and 3.

The several clips 27 are spaced equally apart on each section of the channel base in balanced relation to those of the other section so that each clip of one section is located diametrically opposite a clip of the other section. The two splicing clips 28 are also balanced in diametrically opposed relation.

It is apparent that the ring gear unit 13 may be readily assembled or disassembled from the wheel rim without in any way disturbing or altering the wheel or its rim.

To enable application of the ring gear unit to wheel rims having slightly varying diameters, a shim 72 of a proper thickness, as indicated in FIG. 7, is caused to be inserted between the mounting plate of each clip and the corresponding flange plate 61 of the ring gear unit.

The balanced arrangement of the several clips about the wheel rim restrains the ring gear unit from being disengaged in either a radial or axial direction from the rim.

A modified clip 70, shown in FIGS. 14, 15, differs from clips 27 and 28 in its hook and web portions 73 and 74. This modified form is designed to provide a secure anchorage of the ring gear unit 13 to wheel rims 75 having a relatively shorter lip 76 such as are used with tubeless tires 77. Its hook portion 74 is relatively shallow and engages over a smaller portion of the wheel rim because of the closely positioned adjacent tire wall. To prevent the hook from pulling free of the wheel rim in an axial direction, the web portion 74 of the clip has a pair of fingers or prongs 78 at opposite sides of the neck 79 of the hook. These prongs are positioned against the wheel rim below the overhang of its lip 76. When outward axial pressure is applied to the ring gear unit, sharp edges of the prongs bite into the rim so as to prevent disengagement of the clips from the rim.

What is claimed is:

1. A gear drive assembly for drivingly connecting a wheel of a motor vehicle to a rotary input shaft of an anti-wheel lock-up control device, comprising a ring gear unit adapted to be disposed externally of the wheel in concentric relation thereto, mounting elements anchored to the gear unit adapted for securing the gear unit to the wheel for rotation with the latter, a pinion unit having a hub section adapted to be mounted to the input shaft and having an annular pinion body separably mounted to the hub section driveably engageable by the gear unit, the hub section being flexible and subject to distortion upon application to the pinion body of overload torque by the gear unit, and the pinion body adapted to separate from the hub section upon such distortion occurring in the hub section.

2. A gear drive assembly as in claim 1, wherein the hub section is formed of elastomeric material, and the pinion body is formed of a relatively stiffer material.

3. A gear drive assembly as in claim 1, wherein the separable mounting of the pinion body upon the hub section is defined by means of releasably interlockable rib and groove means formed in part upon the hub section and in part upon the pinion body.

4. A gear drive assembly as in claim 1, wherein the gear unit comprises an annular metal base having annular parallel side walls bridged by an annular back wall so as to define an annular channel, and includes a ring gear detachably seated in the channel.

5. A gear drive assembly as in claim 4, wherein the ring gear has an elastomeric body squeeze fitted in the channel and a succession of gear teeth projecting axially from an exposed face of the elastomeric body.

6. A gear drive assembly as in claim 5, wherein the pinion body is provided about its periphery with a succession of pinion teeth and the gear teeth are axially elongated so as to extend fully between the pinion teeth, each of the gear teeth being of a general hexagonal form in cross section having opposed portions, each of which portions defines a gear tooth, one of the portions being engageable between the pinion teeth when the pinion unit is located at the inside diameter of the ring gear, and the other portion being engageable between the pinion teeth when the pinion unit is located at the outside diameter of the ring gear.

7. A gear drive assembly as in claim 6, wherein the ring gear is formed of a succession of separate segments seated in the channel in end-to-end relation to fill the channel.

8. A gear drive assembly as in claim 5, wherein the back wall of the metal base has a succession of holes therein, and the elastomeric body of the ring gear has a succession of integral plugs plugged into the holes.

9. A gear drive assembly as in claim 1, wherein the mounting elements are arranged about the gear unit in balanced relation to one another, and each mounting element has a free end defining a hook adapted to be clipped over a wheel rim of the wheel.

10. A gear drive assembly as in claim 9, wherein the hook is adapted to be clipped over a lip of the wheel rim, and each mounting element includes a pair of prongs adapted to engage an arcuate rim area of the wheel rim adjacent the lip.

11. In a gear drive assembly including a driving ring gear unit having axially projecting elongated gear teeth; a driven pinion unit, the pinon unit having a hub section subject to distortion under the overload and having a pinion body provided with radially extending teeth about its periphery engaged by the gear teeth, the pinion body being adapted to separate from the hub section upon distortion occurring in the latter.

12. In a gear drive assembly including a driven pinion unit having pinion teeth projecting radially from its periphery, a driving ring gear unit having axially projecting gear unit teeth engaging the pinion teeth, the driving ring gear unit including an annular rigid base having parallel spaced annular side walls and an annular back wall bridging the side walls so as to define an annular channel between the side walls, and a ring gear detachably seated in the channel having an exposed face from which the gear teeth integrally project.

13. In a gear drive assembly as in claim 12, wherein each of the teeth of the ring gear defines a pair of oppositely facing tooth portions, one of which is engageable with the pinion teeth when the pinion unit is located proximate the outside diameter of the ring gear unit, and the other of which is engageable with the pinion teeth when the pinion unit is located proximate the inside diameter of the ring gear unit.

References Cited

UNITED STATES PATENTS

| | | | |
|---|---|---|---|
| 2,307,129 | 1/1943 | Hines et al. | 74—443 X |
| 2,707,884 | 5/1955 | Boisvert | 74—448 |
| 3,199,364 | 8/1965 | Dew | 74—411 X |
| 3,439,551 | 4/1969 | Militana | 74—243 |

LEONARD H. GERIN, Examiner

U.S. Cl. X.R.

74—443, 447, 448